Oct. 10, 1961     L. G. DETERDING ET AL     3,003,490
AIR PROPELLED VEHICLE AND LAUNCHER
Filed March 26, 1958
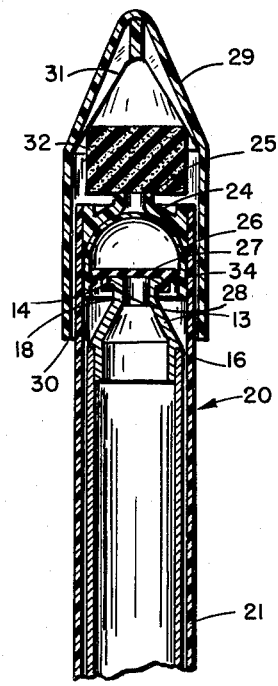
FIG. 1
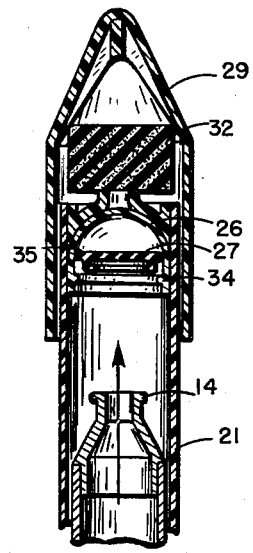
FIG. 2
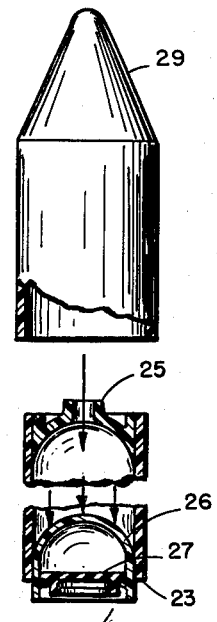
FIG. 4
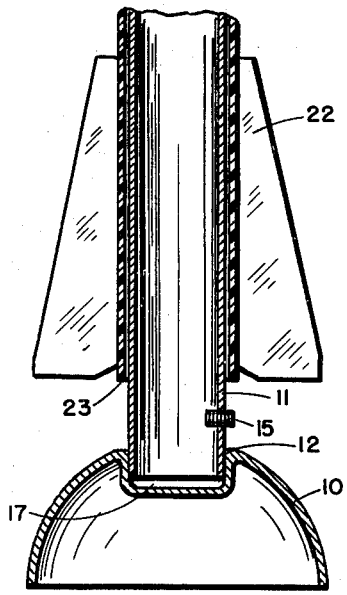
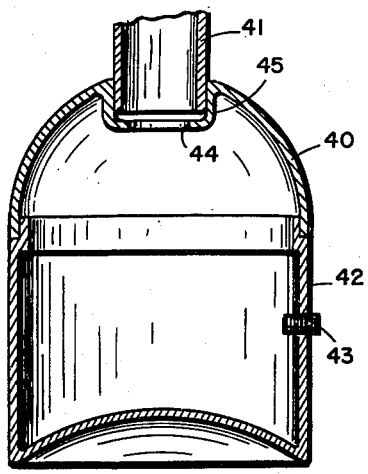
FIG. 3
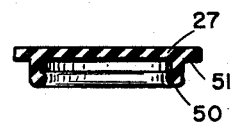
FIG. 5
FIG. 6
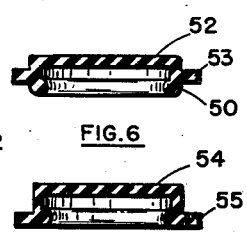
FIG. 7
INVENTORS.
GEORGE H. MATTER
LEO G. DETERDING
BY Thomas S. MacDonald
ATTORNEY

United States Patent Office 3,003,490
Patented Oct. 10, 1961

3,003,490
AIR PROPELLED VEHICLE AND LAUNCHER
Leo G. Deterding and George H. Matter, Anaheim, Calif.; said Matter assignor, by mesne assignments, to said Deterding
Filed Mar. 26, 1958, Ser. No. 724,134
4 Claims. (Cl. 124—11)

The present invention is directed to an air propelled vehicle and launcher. More particularly the invention concerns a compressed air launched toy rocket.

Basically this invention comprises a launching base and pressure cylinder which has telescoped thereover the vehicle or rocket to be launched. The invention is described in terms of a rocket vehicle but it is to be understood that other vehicles, such as airplanes or autos capable of being launched into the air or along the ground, are contemplated as the vehicle launched. The particular toy rocket structure hereinafter described and claimed enables the user to provide for true directed flights of controlled trajectory attaining heights of many hundreds of feet with the utmost safety to the user. The device is triggered automatically upon the attainment of a desired pressure in the launcher which may be adjusted in order to give various flight altitudes.

An object of this invention is to provide an air propelled vehicle which can be launched with safety and give high performance.

A further object of this invention is to provide a compressed air launched rocket.

A further object of this invention is to provide a combined rocket and rocket launcher which particularly coact with each other.

A still further object of this invention is to provide a toy rocket which is recoverable intact and completely reusable.

An additional object of this invention is to provide a toy rocket of rugged construction which is capable of flights to various altitudes of hundreds of feet propelled merely by air compressed a relatively small amount by a hand pump or the like.

The above objects as well as other objects of this invention will be apparent from the following description of the accompanying drawing in which:

FIG. 1 is a cross-sectional view showing the rocket on its launcher prior to release;

FIG. 2 is a cross-sectional view showing the upper part of the launcher and rocket immediately following release;

FIG. 3 is a cross-sectional view of a modification of the launcher base;

FIG. 4 is an exploded partial cross-sectional view of the rocket showing the method of removing the dome and cap member from the rocket tube;

FIG. 5 is a cross-sectional view of a low altitude cap member;

FIG. 6 is a cross-sectional view of a medium altitude cap member; and

FIG. 7 is a cross-sectional view of a high altitude cap member.

The rocket and launcher of this invention as seen in FIG. 1 comprises a launching base portion 10, shown as generally hemispherical in shape, an upstanding cylindrical hollow pressure chamber 11 extending from a reentrant portion 17 formed in the top of the base 10, and an impulse-driven rocket 20 telescoped over the chamber 11. The chamber 11, which may be described as a tube, is soldered or otherwise attached to the base portion 10 as at 12. The reentrant portion 17 acts to seal the interior of tube 11 at its lower end. The tube 11 has a top portion 13 with a peripheral ridge 16 which is soldered or otherwise attached to the top edge of tube 11. This top portion 13 has an upper peripheral lip 14 on an upper cylindrical end 18 which cooperates with the hereinafter described cap member. The launching mechanism is completed by providing a bicycle tire valve 15 at a lower extremity of tube 11. The tube 11 may be of welded steel and is designed to withstand any desired gage pressure such as 250 pounds per square inch.

The rocket 20 comprises an elongated hollow rocket tube 21 open at its rear end 23 and having an inner surface slidably fitted over the launching tube 11. The inside diameter of the tube 21 in one particular model of rocket is 1.515+0.010 inches which slides on a launcher tube of 1.500+0.010 inches outer diameter thus allowing a close sliding fit. Flight stabilizing vanes 22 are provided spaced apart 90 degrees around and attached to the circumference of the rocket tube 21. It is preferred that the rocket assembly be slightly tail heavy so that when the rocket reaches the top of its trajectory it will tend to "float" to earth rather than dive. As the trajectory of the rocket flattens at the top and it starts to fall tail first the action of the supporting air on the vanes tends to rotate the rocket around its center of gravity so that the rocket "floats" down somewhat in the manner of a falling feather. The preferred structural material for the rocket tube 21, vanes 22 and other rocket parts is rigid polyvinyl chloride plastic although other plastics such as polyethylene and metals such as aluminum may be employed. Attached as by cement or heat bonding to the rocket tube 21 is a rocket cap end 24 having an air blow hole or aperture 25 centrally located thereon. A slidable dome member 26, having a typical outside diameter about 0.005 inch less than the inner diameter of the rocket tube, affording a loose friction fit, is provided within the rocket tube 21 which acts to seal the hole 25 when a force is applied on the inner surface of the dome 26 since the free edge will tend to expand against the inner wall of tube 21. An inner peripheral ridge 34 is provided at the bottom free edge of the dome 26 which acts to retain a cap member 27 following launching. The dome 26 is retained by friction at the top of the rocket tube during flight. A nose cone 29 having strengthening ribs 31 at the inner tip is slidably mounted over the top end of tube 21 with sufficient clearance, typically 0.005 inch, as at 30 to move with respect to the tube. A shock absorbing pad 32, preferably of polyurethane foamed plastic abuts the ribs 31 and the top of cap end 24. While the inclusion of a nose cone is preferred for shock and streamlining considerations, the rocket of this invention is usable without the shock absorbing nose cone. The cap member 27 has an inner peripheral ridge 28 thereon which in a pre-launch position is press-fitted over the ridge 14 at the top of the launcher top portion 13.

FIG. 2 shows the upper part of the rocket and launcher immediately after launching. Launching is accomplished by pressurizing the interior of the launching tube 11 by means of a hand pump or source of compressed air which is pumped or otherwise admitted through a one-way or bicycle tire valve 15. Upon the attainment of a predetermined pressure within chamber 11 the cap member 27 is pressure releasable. Release of the pressure from chamber 11 forces the cap member 27 further into the dome member 26 as at 35 which dome in turn is forced into tighter sealing engagement with the rocket tube end sealing the end hole 25. The forces released from the cylinder 11 thus act directly on the inside of the rocket at its nose which makes the rocket fly straight and true with a controlled trajectory. The released forces continue to act on the inside of the rocket tube until the rocket tube is free of the launching tube. The casings of the launcher and rocket may be extended to lengthen the time which the pressure is acting on the rocket interior. Thus the telescoped length of the tube and launcher dictates, along with diameter, pressure and clearance, the theoretical attainable height of the rocket firing.

FIG. 3 shows a high altitude launching base in which a larger pressure chamber is provided directly in the launcher base. A cylindrical portion 42 having an entrance valve 43 is welded or otherwise attached to a hemispherical portion 40. This portion 40 has a reentrant portion 45, having an aperture 44 at the bottom thereof, holding an upstanding launcher tube 41. This added volume is particularly effective with longer rocket and launcher tubes and higher pressure operation.

FIG. 4, in an exploded view, illustrates the method of reuse of the rocket missile. Following landing of the rocket in which the vanes stabilize the flight and the nose cone absorbs landing shocks, the nose cone is removed by hand by sliding it off the top end of the rocket tube. The dome member 26 is then forced out of the rear end 23 of the rocket by blowing in through blow hole 25 as indicated by straight arrows. The free edges of dome 26 are forced outwardly after the dome is removed from the rocket to remove pressure cap member 27 as seen by the curved arrow. The cap member 27 is then placed again on the launcher cap end 18 over ridges 14, dome 26 is then snapped over the cap member 27 and the rocket telescoped over the launching tube. After the nose cone is placed over the rocket tube the rocket is again ready for launching by pressurizing cylinder 11.

FIGS. 5, 6 and 7 illustrate various pressure cap members which can be used for low, medium and high pressure release and for varying flight altitudes. The releasability of the cap is accomplished by the flexing or stretching of the inner bulbous portion 50 by the inner pressures acting thereon so that the cap is released over the ridge 14 of the launching tube top 13. This may be accomplished by moving the mass of the cap downwardly so as to more resist the internal pressures. In FIG. 5 the mass 51 is at the top of cap and is for low pressure-low altitude operation. In FIG. 6 the mass 53 is positioned midway of the ends of cap 52 and is for medium pressure-medium altitude operation. In FIG. 7 the mass 55 is positioned at the lower end of plastic cap 54 and is for high pressure-high altitude operation. Change in mass may also be accomplished by providing caps which have the peripheral surface of the mass serrated to a desired degree to give less resistance to outward movement. In the preferred form of the invention the plastic cap is releasably held in the dome member thus affording the advantage that the cap rides with the rocket during flight and is recoverable therewith. When the cap member is not so held it will ordinarily drop out of the rocket tube after launching and possibly be lost.

The launcher device described above, at pressure buildups of 45–90 p.s.i., has shot a rocket to approximately a 750 foot altitude and such rocket due to its launching and flight stability has landed within a ten foot predetermined circle. The device is relatively simple in construction and operation as well as being materially safer than chemical propelled rockets and affords young rocket enthusiasts high altitude flight capabilities heretofore unattainable without risk of bodily injury.

Although the invention has been described and illustrated in detail, it is to be clearly understood that the same is by way of illustration and example only and is not to be taken by way of limitation, the spirit and scope of this invention being limited only by the terms of the appended claims.

We claim:
1. A combined toy rocket and launcher comprising a base portion with a relatively flat bottom surface, a hollow launcher tube extending substantially upwardly from said base portion, means including exterior peripheral lip means forming a top exit aperture from said tube, a pressure releasable cap including interior peripheral lip means adapted to be connected to said first mentioned means sealing said exit aperture, a hollow rocket tube having an open bottom and adapted to be telescoped in a close fit substantially over the entire length of said launcher tube, slidable dome means in said rocket tube adapted to seal the top end of said rocket tube, means in said dome means to retain said cap, a nose cone having shock absorbing means therein, slidably fitting on an exterior surface at the top of said rocket tube and means to pressurize the interior of said launcher tube to a predetermined pressure to force said interior lip means peripherally outward to release said cap, force said dome in sealing relation with the top interior of said rocket tube and to propel said rocket tube, cap, dome and nose cone off of said launcher tube to a prescribed altitude range.

2. The invention as set out in claim 1 further including means forming an aperture in the top surface of said rocket tube above said dome for blowing said dome and retained cap from said rocket tube upon recovery after rocket flight.

3. The invention as set out in claim 1 including exterior stabilizing vanes adjacent to the open bottom end of said rocket tube and in which the propelled rocket tube is slightly tail heavy allowing said rocket tube to more slowly drop after reaching a flight summit.

4. A combined toy rocket and launcher comprising a base portion with a relatively flat bottom surface, a hollow launcher tube extending substantially upwardly from said base portion, means including exterior peripheral lip means forming a top exit aperture from said tube, a pressure releasable cap including interior peripheral lip means adapted to be connected to said first mentioned means sealing said exit aperture, a hollow rocket tube having an open bottom end adapted to be telescoped in a close fit substantially over the entire length of said launcher tube, a shock absorbing nose cone slidably fitting on the top peripheral surface of said rocket tube and means to pressurize the interior of said launcher tube to a predetermined pressure to force said interior lip means peripherally outward to release said cap, and to propel said rocket tube, cap, and nose cone off of said launcher tube to a prescribed altitude range.

References Cited in the file of this patent

UNITED STATES PATENTS

| | | |
|---|---|---|
| 433,674 | Irvine | Aug. 5, 1890 |
| 1,863,081 | Bellows | June 14, 1932 |
| 2,521,135 | Stark et al. | Sept. 5, 1950 |
| 2,604,223 | Horning | July 22, 1952 |
| 2,621,441 | Worden | Dec. 16, 1952 |
| 2,733,699 | Krinsky | Feb. 7, 1956 |
| 2,833,266 | Mares | May 6, 1958 |

FOREIGN PATENTS

| | | |
|---|---|---|
| 474,435 | Italy | Sept. 23, 1952 |